(12) United States Patent
Yoshizawa et al.

(10) Patent No.: US 7,354,677 B2
(45) Date of Patent: Apr. 8, 2008

(54) BATTERY PACK

(75) Inventors: Hiroshi Yoshizawa, Hirakata (JP); Koji Saito, Moriguchi (JP); Katsuyuki Shirasawa, Osaka (JP); Shinji Ohta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 654 days.

(21) Appl. No.: 10/736,536

(22) Filed: Dec. 17, 2003

(65) Prior Publication Data

US 2004/0146775 A1 Jul. 29, 2004

(30) Foreign Application Priority Data

Jan. 27, 2003 (JP) ............................. 2003-017918

(51) Int. Cl.
*H01M 10/50* (2006.01)
*H01M 10/40* (2006.01)
*H01M 4/52* (2006.01)

(52) U.S. Cl. ...................... 429/62; 429/61; 429/231.3; 429/330

(58) Field of Classification Search ..................... None
See application file for complete search history.

(56) References Cited

U.S. PATENT DOCUMENTS 6,605,386 B1 * 8/2003 Kasamatsu et al. ...... 429/218.1
6,991,752 B2 * 1/2006 Nagayama et al. ...... 252/521.2

FOREIGN PATENT DOCUMENTS

| JP | 2001-216883 | * | 8/2001 |
| JP | 20001-283828 | A | 10/2001 |
| JP | 2002-150918 | A | 5/2002 |

* cited by examiner

*Primary Examiner*—John S. Maples
(74) *Attorney, Agent, or Firm*—McDermott Will & Emery LLP

(57) ABSTRACT

A battery pack comprising a lithium ion secondary battery and a current interrupting device for protecting the secondary battery, the secondary battery comprising positive and negative electrodes, a separator interposed between the positive and negative electrodes and a non-aqueous electrolyte, the current interrupting device comprising a recoverable device and a non-recoverable device, the recoverable and non-recoverable devices being connected in series with each other, and the non-recoverable device having an operating temperature of not less than 90° C. and less than 150° C.

4 Claims, 4 Drawing Sheets

BATTERY PACK

BACKGROUND OF THE INVENTION

With the proliferation of mobile electronic devices in recent years, development for a lithium ion secondary battery with high energy density and high output has been proceeding. However, since a lithium ion secondary battery contains an electrolyte comprising a non-aqueous solvent and a lithium salt dissolved therein, when a large current flows across the battery due to a short circuit or rupture, or the battery is overcharged, the battery temperature may rapidly increase, leading to thermal runaway.

In order to obviate this, a protective circuit (hereinafter referred to as "SU (safety unit) circuit") is installed, or a current interrupting device that operates in the case of the breakdown of the SU circuit, such as a PTC (Positive Temperature Coefficient) device or a thermal fuse, is used as backup in a battery pack that houses the lithium ion secondary battery. However, since the SU circuit is expensive and its structure is complicated, demand is increasing for an inexpensive circuit with a simple structure.

At the same time, there is proposed a simple-structured current interrupting device comprising a recoverable device and a non-recoverable device connected in series with each other, and its weight and size reduction is also proceeding (see Japanese Laid-Open Patent No. 2002-150918).

The recoverable devices include a PTC device, a shape memory alloy device (hereinafter referred to as "SMA device") (see Japanese Laid-Open Patent Publication No. 2001-283828), etc, all of which have functions to first break a current and then restore the current.

The non-recoverable devices include a thermal fuse and a pattern fuse, both of which completely break a current in the case of the breakdown of the recoverable device and function as the backup for the recoverable device.

When the battery is suddenly exposed to harsh temperature conditions or the like, however, the non-recoverable device may operate prior to the recoverable device, depending on the battery atmosphere to be used. In such cases, a defect that the battery can no longer be used arises although it does not negatively affect the battery performance. In order to prevent this, the operating temperature of the conventional non-recoverable device is usually set to not less than 150° C. This can prevent the problem that the non-recoverable device operates prior to the recoverable device, but thermal runaway may not be prevented by the non-recoverable device when the operating temperature of the non-recoverable device is set to such a high temperature.

Accordingly, a method for enhancing the thermal resistance of an overcharged battery by optimizing a positive electrode material and a non-aqueous electrolyte is conceived. However, once the battery temperature is increased to about 150° C., the optimization effect is diminished and thermal runaway may not be prevented.

In the case of a lithium ion secondary battery, once the battery temperature is increased to not less than 90° C., the battery will not exhibit its full performance even if the battery is used again. Therefore, even if the non-recoverable device operates prior to the recoverable device, it is presumed that there is no actual damage caused.

BRIEF SUMMARY OF THE INVENTION

In view of the above, an object of the present invention is to provide a highly safe battery pack for a lithium ion secondary battery that can be produced with low cost.

More specifically, the present invention relates to a battery pack comprising a lithium ion secondary battery and a current interrupting device for protecting the secondary battery, the secondary battery comprising positive and negative electrodes, a separator interposed between the positive and negative electrodes and a non-aqueous electrolyte, the current interrupting device comprising a recoverable device and a non-recoverable device, the recoverable and non-recoverable devices being connected in series with each other, and the non-recoverable device having an operating temperature of not less than 90° C. and less than 150° C.

The non-recoverable device preferably has an operating temperature of not less than 90° C. and not greater than 140° C., more preferably an operating temperature of not less than 90° C. and not greater than 130° C.

Examples of the recoverable device for use include a bimetallic device, an SMA device or a PTC device. Examples of the non-recoverable device for use include a thermal fuse or a pattern fuse.

The positive electrode preferably comprises a composite oxide containing lithium, cobalt and magnesium. The composite oxide is preferably represented by the general formula: $Li_zCo_{1-x-y}Mg_xM_yO_2$ where the element M is at least one selected from the group consisting of Al, Ti, Sr, Mn, Ni and Ca, and the values x, y and Z respectively satisfy:

$$0.005 \leq x \leq 0.1;$$

$$0.001 \leq y \leq 0.03; \text{ and}$$

$$0.97 \leq z \leq 1.02.$$

The use of such positive electrode active material enhances the stability thereof during overcharging, thereby further promoting the safety of the battery pack.

The non-aqueous electrolyte preferably comprises a non-aqueous solvent and a solute dissolved in the non-aqueous solvent. The non-aqueous solvent preferably comprises ethylene carbonate and γ-butyrolactone.

The use of such non-aqueous electrolyte enhances the stability of the battery during overcharging, thus further promoting the safety of the battery pack.

Thermal runaway can be completely prevented by using the current interrupting device including the non-recoverable device with an operating temperature of less than 150° C., the aforesaid positive electrode and non-aqueous electrolyte without an SU circuit.

While the novel features of the invention are set forth particularly in the appended claims, the invention, both as to organization and amount, will be better understood and appreciated, along with other objects and features thereof, from the following detailed description taken in conjunction with the drawings.

DETAILED DESCRIPTION OF THE INVENTION

Descriptions of an example of a battery pack comprising a current interrupting device with a PTC device as the recoverable device are given below referring to FIGS. 1 to 4. It is to be noted that, other than a PTC device, a bimetallic device, an SMA device, etc can be used as the recoverable device. A thermal fuse, pattern fuse, etc can be used as the non-recoverable device.

Figure 1:
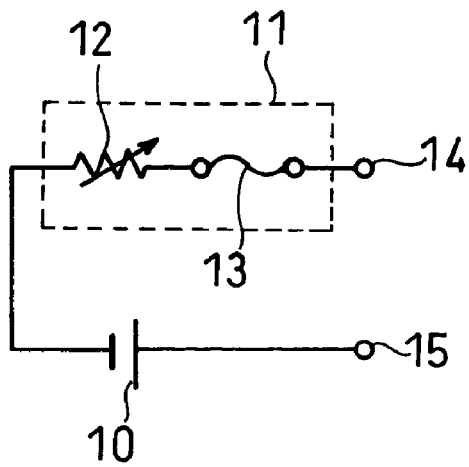
FIG. 1 is a circuit diagram showing the connection of a current interrupting device in accordance with the present invention with a lithium ion secondary battery.

FIG. 1 is a circuit diagram showing the connection of a current interrupting device 11 in accordance with the present invention with a lithium ion secondary battery 10. The current interrupting device 11 comprises a PTC device 12 and a non-recoverable device 13 which are connected in series with each other. The non-recoverable device 13 is connected to an external negative electrode terminal 14 of the battery pack. The positive electrode of the lithium ion secondary battery 10 is connected to an external positive electrode terminal 15 of the battery pack.

Figure 2:
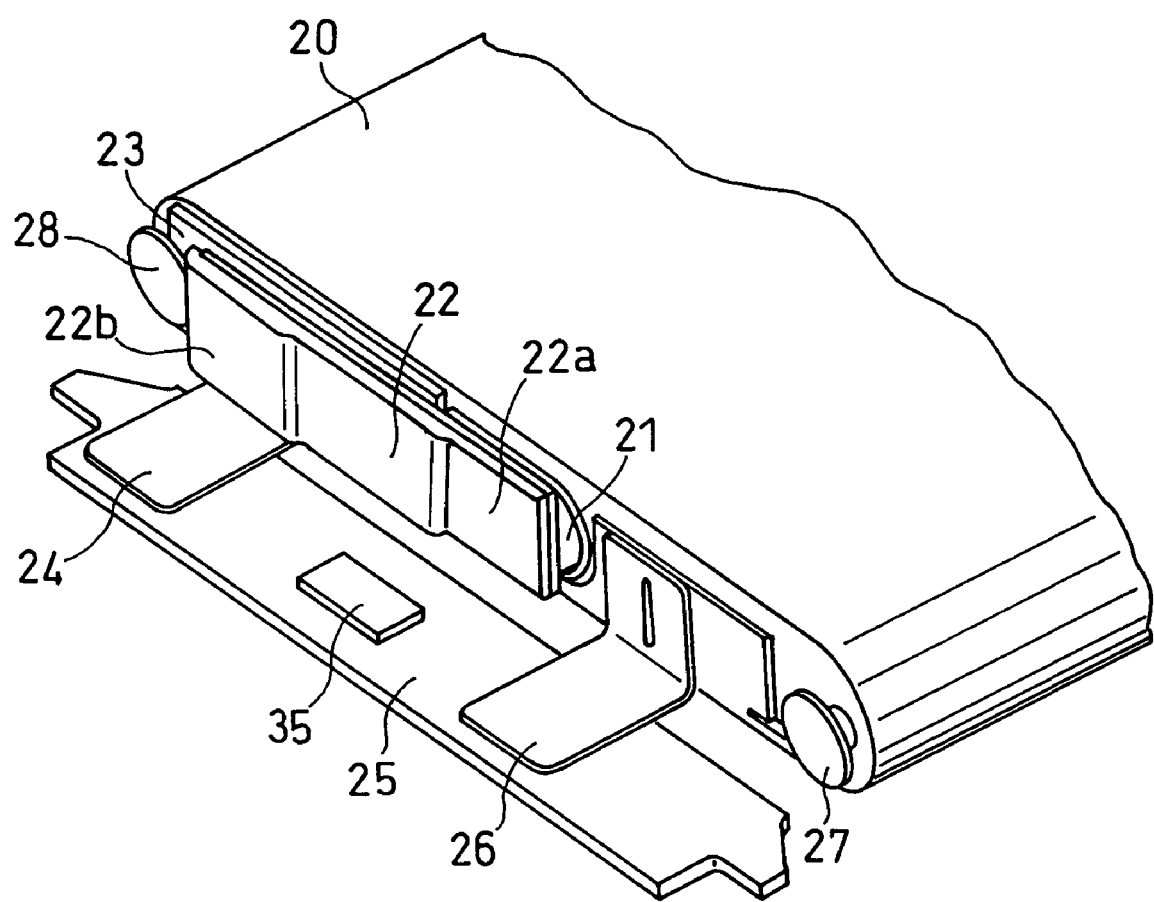
FIG. 2 is an oblique view of a relevant part of a battery pack in accordance with the present invention.
Figure 3:
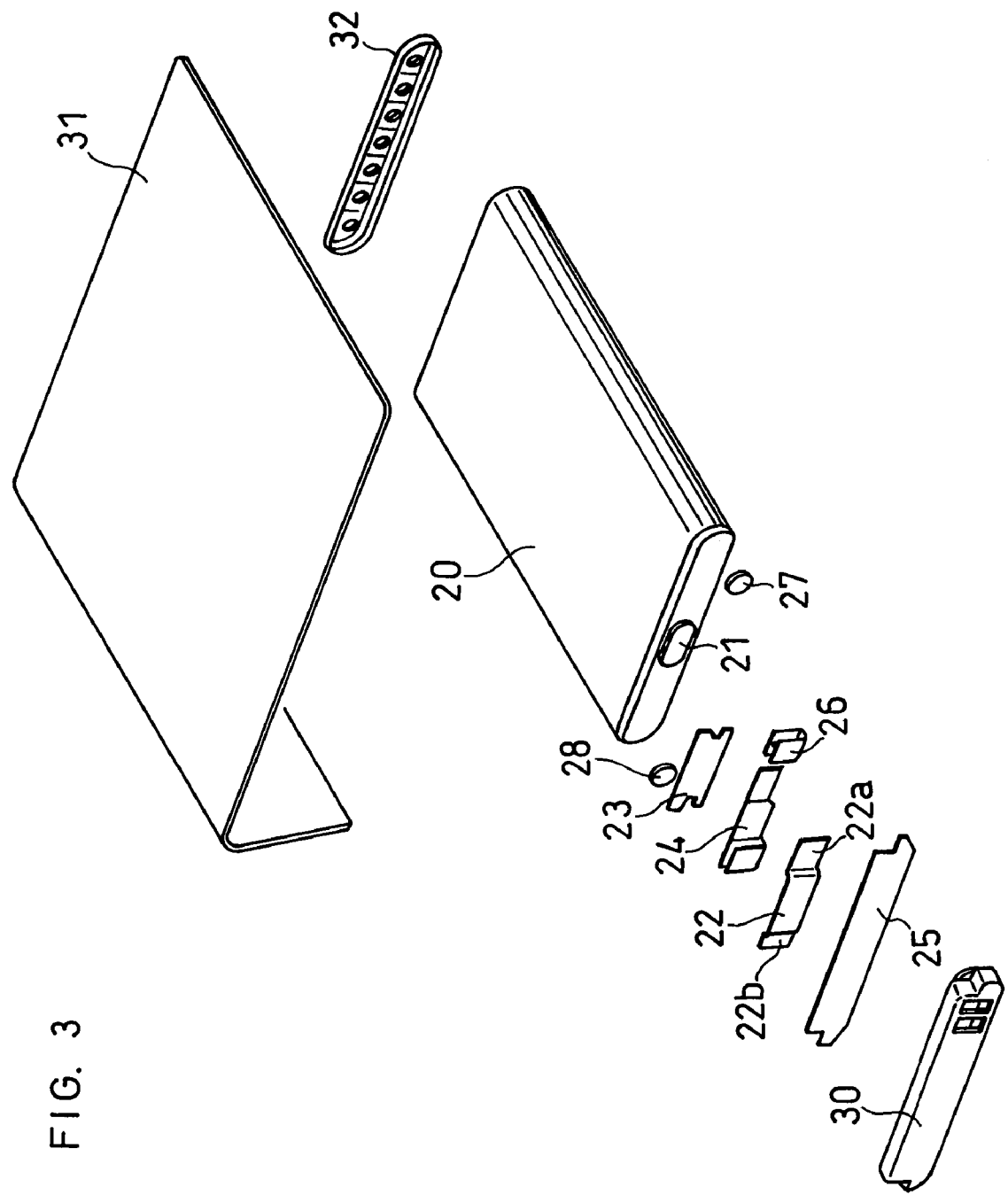
FIG. 3 is an exploded view of the battery pack shown in FIG. 2.

FIG. 2 is an oblique view of a relevant part of the battery pack connected according to the circuit diagram shown in FIG. 1. FIG. 3 is an exploded view of the battery pack.

The battery case 20 for the lithium ion secondary battery is electrically connected to the positive electrode located in the battery. In the center of one end face of the battery case is provided a negative electrode terminal 21 insulated from the periphery and electrically connected to the negative electrode located in the battery. The negative electrode terminal 21 is connected to one end portion 22a of an almost flat PTC device 22 facing toward the negative electrode terminal 21 so that the residual portion of the PTC device faces the end face of the battery case with an insulating plate 23 interposed therebetween. The other end portion 22b of the PTC device is connected to the negative electrode side of a non-recoverable device 35 arranged on a substrate 25 by a negative electrode-side hook 24. In FIG. 2, the negative electrode-side hook 24 is L-shaped, but is actually U-shaped as shown in FIG. 3 so that the other end portion 22b is inserted in the U-shaped hook.

The portion across the end face of the battery case from the hook 24 is connected to the positive electrode side of the non-recoverable device 35 arranged on the substrate 25 by a positive electrode-side hook 26. The substrate 25 is held horizontally by spacers 27 and 28 respectively positioned on each side of the end face of the battery case. On the substrate 25 are provided an external positive electrode terminal and an external negative electrode terminal, and the end face of the battery case is covered with a cover 30 having openings corresponding to the external positive electrode terminal and the external negative electrode terminal, respectively. The whole side of the battery case is covered with a film-like outer jacket material 31. The bottom of the battery case is provided a bottom plate 32 for securing the outer jacket material. Although not shown in the figure, the space between the substrate 25 and the end face of the battery case is sealed with an insulating resin.

Figure 4:
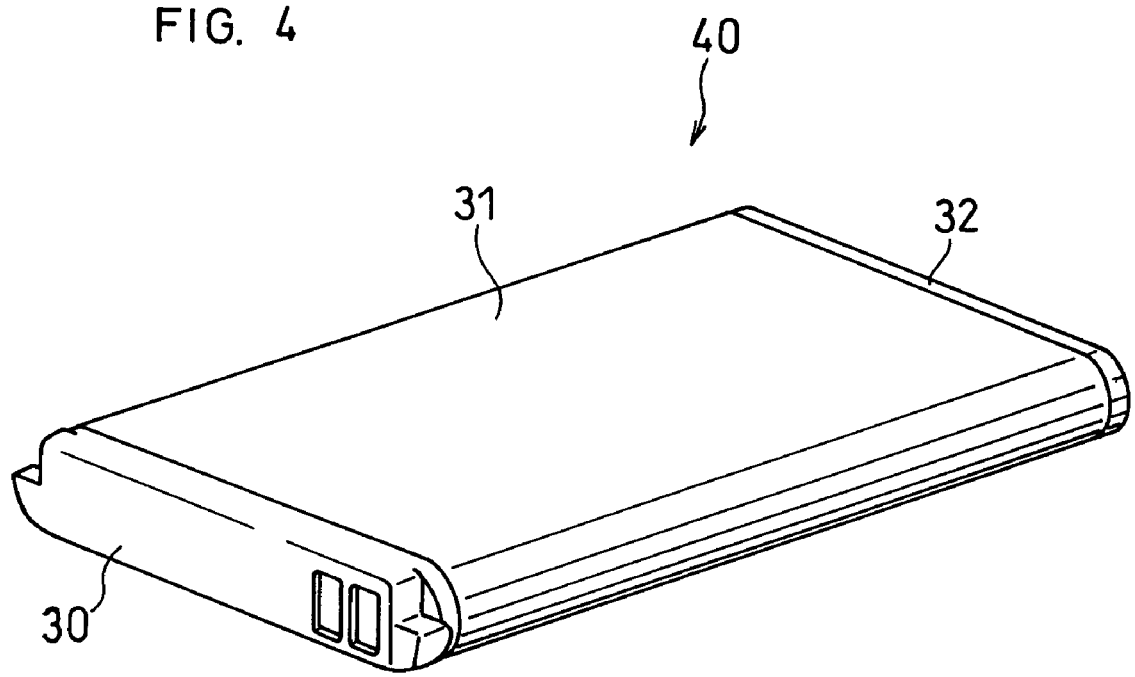
FIG. 4 is an oblique view of a battery pack in accordance with the present invention with a cover and a bottom plate fixed thereto.

FIG. 4 shows an oblique view of a battery pack 40 with the cover 30 and the bottom plate 32 secured thereto.

The PTC device has a function to reduce the current value or to interrupt the current when the battery temperature is increased by overcharging or overcurrent because the resistance value abruptly increases upon reaching a certain operating temperature. In the case where the PTC device is out of order and unable to control or interrupt the current, the non-recoverable device connecting to the PTC device in series senses the overcurrent or temperature, and interrupts the current completely.

In the case where the PTC device normally functions, the PTC device temperature is decreased to the recovery temperature in a while to reduce the resistance value, and then a normal current flows through the circuit again. On the other hand, once the non-recoverable device is activated, the battery pack will be disabled because there is no means to recover the current in the circuit. This, however, does not cause any actual disadvantage because the secondary battery once exposed to such a high temperature as the non-recoverable device is activated does not function normally any more. On the contrary, the current does not flow in the damaged secondary battery and therefore the safety of the battery pack is improved.

When the temperature of the secondary battery is increased to not less than 90° C., its separator is damaged and hence normal charge/discharge characteristics cannot be obtained. Accordingly, even if the operating temperature of the non-recoverable device is set to not less than 90° C., there is no major disadvantage.

However, the operating temperature of the non-recoverable device should be set to a temperature capable of preventing thermal runaway of the secondary battery. Once the temperature of the battery pack is increased to not less than 150° C., the secondary battery becomes extremely unstable. Therefore, even if the current is broken after that, thermal runaway may not be prevented. The threshold value at which thermal runaway starts is considered to be not less than 150° C.

When the secondary battery is extremely unstable, thermal runaway is unlikely to be prevented even if a highly stable positive electrode active material and a suitable non-aqueous electrolyte are used. Accordingly, the operating temperature of the non-recoverable device should be set to less than 150° C., preferably not greater than 140° C., most preferably not greater than 130° C.

At the same time, if the current can be broken before the battery temperature reaches a given threshold value, The effect of improving safety resulting from the use of a highly safe positive electrode active material and a suitable non-aqueous electrolyte will be greatly enhanced. Even if a positive electrode active material and a non-aqueous electrolyte are optimized, when the temperature reaches a given threshold value, the stabilization effect of such a degree due to the optimization is within a margin of error and therefore thermal runaway cannot be prevented. However, the effect resulting from the optimization of a positive electrode active material and a non-aqueous electrolyte largely contributes to the safety of the battery pack by interrupting the current before the brink of thermal runaway. It is to be noted that, even if the current is cut off before the brink of threshold value, there are cases where the effect of preventing thermal runaway is small depending on the positive electrode active material and non-aqueous electrolyte used.

In order to enhance the safety of the battery, a composite oxide containing lithium, cobalt and magnesium is preferably used as a positive electrode active material. An example of such composite oxide is the one represented by the general formula: $Li_zCo_{1-x-y}Mg_xM_yO_2$. In the formula, it is preferred that the element M is at least one selected from the group consisting of Al, Ti, Sr, Mn, Ni and Ca, and the values x, y and z satisfy $0.005 \leq x \leq 0.1$, $0.001 \leq y \leq 0.03$, and $0.97 \leq z \leq 1.02$, respectively.

When the value z is less than 0.97, the capacity of the active material becomes insufficient. Conversely, when the value z exceeds 1.02, the amount of lithium becomes excessive and the active material becomes relatively strongly alkaline, causing disadvantages.

Magnesium is considered to have extremely strong binding force with oxygen. Accordingly, the addition of a magnesium source to a raw material mixture for the active material has the effect of preventing oxygen defect in the active material. Further, magnesium is also considered to have the effect of preventing particles from sintering during the synthesis of the active material. When the value x is less than 0.005, the amount of Mg is too small and the active material will not be stable enough. Conversely, when the value x exceeds 0.1, the amount of Mg is too much, which causes capacity loss of the active material. In the range where capacity loss is tolerated, the larger the amount of Mg is, the more preferred it is. Namely, the amount of Mg is preferably $0.08 \leq x$.

The element M is an element necessary for the improvement of cycle characteristics of the secondary battery. Among Al, Ti, Sr, Mn, Ni and Ca, it is particularly preferred to use Al, Mn and Ni. In order to obtain the effect of the element M, the value y should at least satisfy $0.001 \leq y$. When the value y is $0.03 < y$, the problem of capacity loss of the active material arises.

As for the negative electrode, it can be made of any material that has been used for lithium ion secondary batteries, but it is preferred to use a carbonaceous material as a negative electrode active material.

In order to enhance the safety of the battery, the non-aqueous electrolyte is preferably made of a mixture obtained by dissolving a solute in a non-aqueous electrolyte comprising ethylene carbonate and γ-butyrolactone. In order to maintain an extremely high level of safety in the battery, the amount of ethylene carbonate in the non-aqueous solvent is preferably 10 to 50 vol %, and that of γ-butyrolactone in the non-aqueous solvent is preferably 10 to 90 vol %.

When the amount of ethylene carbonate is less than 10 vol %, a film made from ethylene carbonate having the effect of preventing the decomposition of γ-butyrolactone will not be sufficiently formed on the negative electrode. When the amount of ethylene carbonate exceeds 50 vol %, the battery will have reduced low-temperature discharge characteristics.

When the amount of γ-butyrolactone is less than 10 vol %, the effect of enhancing the safety of the battery during overcharging is insufficient. When the amount of γ-butyrolactone exceeds 90 vol %, it is difficult to prevent the decomposition of γ-butyrolactone on the negative electrode.

A separator comprising microporous polyethylene resin is unlikely to be saturated with the non-aqueous solvent comprising ethylene carbonate and γ-butyrolactone. Accordingly, the injection of the electrolyte is likely to require a longer time in the process of producing the battery. In order to shorten the injection time, it is effective to add diethyl carbonate to such electrolyte. The larger the amount of diethyl carbonate in the non-aqueous solvent is, the more likely the separator is to be saturated with the electrolyte, thereby shortening the injection time of the electrolyte. Nevertheless, the effect of enhancing the safety of the battery will be small. The amount of diethyl carbonate in the non-aqueous solvent should be not greater than 50 vol %, and preferably not greater than 30 vol %.

The solute can comprise any material that has been used as a solute for lithium ion secondary batteries, but a lithium salt is preferred. For example, $LiPF_6$, $LiBF_4$, etc can be used. These salts may be used singly or in combination of two or more.

The recoverable device must be activated before the non-recoverable device, and therefore the operating temperature of the recoverable device should be not more than 10° C. lower than that of the non-recoverable device. The battery pack designed in that manner is likely to have current interruption by the recoverable device, but the possibility that the battery pack may be disabled can be minimized.

The temperature at which the recoverable device recovers the current is preferably set to 40 to 60° C. A temperature difference of 10 to 50° C. is preferably created between the recovering temperature and the operating temperature for current interruption.

A pattern fuse has a function as a temperature-sensing device, and it operates on the premise that a large current flows through the circuit. A thermal fuse, on the other hand, operates not only when a large current flows through the circuit, but also when the current is small if the battery temperature is increased. Therefore, the use of a thermal fuse has a greater advantage in terms of safety than the use of a pattern fuse. In terms of cost, however, a pattern fuse is advantageous.

Then, the battery pack of the present invention is described based on EXAMPLES.

EXAMPLE 1

(i) Production of Positive Electrode

A raw material mixture was obtained by mixing cobalt oxide as a cobalt source and lithium carbonate at a molar ratio of cobalt and lithium of 1:1.01.

Then, the obtained raw material mixture was baked at 900° C. in an air atmosphere for 10 hours to give a positive electrode active material $Li_{1.01}CoO_2$.

Hundred parts by weight of the obtained $Li_{1.01}CoO_2$ was mixed with 3 parts by weight of acetylene black as a conductive material, 7 parts by weight of polytetrafluoroethylene as a binder and 100 parts by weight of aqueous solution containing 1 wt % of carboxymethyl cellulose, which was then stirred and blended to give a positive electrode material mixture paste. The positive electrode material mixture was applied onto the both faces of an aluminum foil substrate with a thickness of 30 μm, which was then dried. The dried film with the substrate was rolled by a roller, which was then cut into a predetermined size to give a positive electrode. A positive electrode lead made of aluminum was welded to the positive electrode.

(ii) Production of Negative Electrode

Flake graphite was pulverized and sieved into particles with a mean particle size of about 20 μm. Hundred parts by weight of the obtained flake graphite was mixed with 3 parts by weight of styrene butadiene rubber as a binder and 100 parts by weight of an aqueous solution containing 1 wt % of carboxymethyl cellulose, which was then stirred and blended to give a negative electrode material mixture paste. The negative electrode material mixture was applied onto the both faces of a copper foil substrate with a thickness of 20 μm, which was then dried. The dried film with the substrate was rolled by a roller, which was then cut into a predetermined size to give a negative electrode. A negative electrode lead made of nickel was welded to the negative electrode.

(iii) Preparation of Non-Aqueous Electrolyte

A non-aqueous electrolyte was prepared by dissolving $LiPF_6$ in a solvent mixture of ethylene carbonate (EC) and diethyl carbonate (DEC) at a volume ratio of 30:70 at a $LiPF_6$ concentration of 1 mol/L.

(iv) Assembly of Battery

Figure 5:
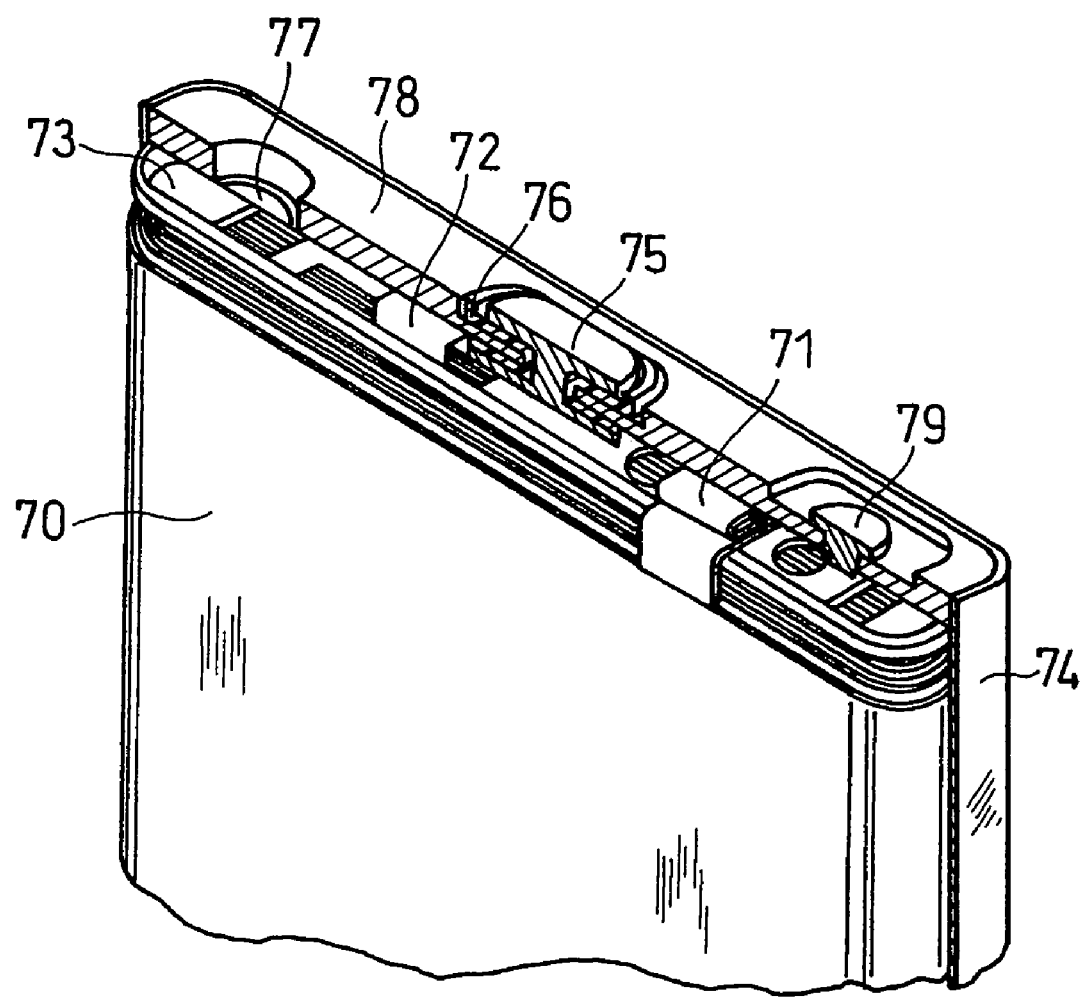
FIG. 5 is a partially cutaway oblique view of a lithium ion secondary battery.

A lithium ion secondary battery as shown in FIG. 5 was assembled.

The positive and negative electrodes were spirally wound with a porous polyethylene resin separator with a thickness of 25 μm interposed therebetween to construct an electrode group 70. The ends of a positive electrode lead 71 made of aluminum and a negative electrode lead 72 made of nickel were respectively welded to the positive and negative electrodes. On the top of the electrode group was provided an insulating plate 73 made of polyethylene resin, which was then housed in a battery case 74. The other end of the positive electrode lead was spot-welded to the underside of a sealing plate 78 with a safety valve 77 described below. The other end of the negative electrode lead was electrically connected to the underside of a negative electrode terminal 75 made of nickel inserted into a terminal hole located in the center of the sealing plate with an insulating material 76 surrounding the negative electrode terminal 75. The opening end of the battery case and the periphery of the sealing plate were laser welded. Then, a predetermined amount of the non-aqueous electrolyte was fed from an inlet provided in the sealing plate. Finally, a sealing stopper 79 made of aluminum was placed on the inlet, which was then laser welded to hermetically seal the inlet to give a battery.

(v) Production of Battery Pack

Hundred battery packs as shown in FIGS. 2 to 4 were produced.

This example used a current interrupting device comprising a PTC device and a thermal fuse connected in series with each other. One end of the PTC device was connected to the negative electrode terminal of the secondary battery and the other end thereof was connected to one end of the thermal fuse arranged on a specified substrate. The other end of the thermal fuse was connected to the external negative electrode terminal of the battery pack arranged on the substrate. The sealing plate of the secondary battery electrically connected to the positive electrode is connected to the external positive electrode terminal arranged on the substrate. The PTC device used here had an operating temperature of 90° C., a current recovering temperature of 50° C., and a withstand voltage of 28 V. The thermal fuse used here had an operating temperature of 130° C.

(vi) Evaluation of Battery Pack

A predetermined voltage was applied to each of the battery packs such that the PTC device was damaged by a short circuit. After that, a voltage of 50 V was applied thereto and each of the batteries was overcharged at a current value of 1200 mA. Accordingly, the temperature of each of the secondary batteries was increased to activate the thermal fuse. The battery packs were observed for a while after the activation of the thermal fuse. Two out of the 100 battery packs emitted smoke, and the remaining 98 batteries emitted no smoke at all.

EXAMPLE 2

Battery packs analogous to the one in EXAMPLE 1 were produced except that a thermal fuse with an operating temperature of 140° C. was used instead of the thermal fuse with an operating temperature of 130° C., and an evaluation was made in the same manner as in EXAMPLE 1. As a result, 3 out of the 100 battery packs emitted smoke, and the remaining 97 batteries emitted no smoke at all.

COMPARATIVE EXAMPLE 1

Battery packs analogous to the one in EXAMPLE 1 were produced except that a thermal fuse with an operating temperature of 150° C. was used instead of the thermal fuse with an operating temperature of 130° C., and an evaluation was made in the same manner as in EXAMPLE 1. As a result, 10 out of the 100 battery packs emitted smoke.

As is evident from the results of EXAMPLES 1 and 2 and COMPARATIVE EXAMPLE 1 described above, when the non-recoverable device with an operation temperature of 150° C. was used, the number of battery packs developing thermal runaway was increased compared to when the non-recoverable device with an operating temperature of less than 150° C. was used.

EXAMPLE 3

A eutectic hydroxide containing cobalt and magnesium at a molar ratio of 0.945:0.05 was prepared.

The eutectic hydroxide was mixed with aluminum hydroxide and lithium carbonate to give a raw material mixture containing cobalt, magnesium, aluminum and lithium at a molar ratio of 0.945:0.05:0.005:1.01.

Then, the obtained raw material mixture was baked at 1050° C. in an air atmosphere for 10 hours to give a positive electrode active material $Li_{1.01}Co_{0.945}Mg_{0.05}Al_{0.005}O_2$.

A positive electrode was produced in the same manner as in EXAMPLE 1 except that the $Li_{1.01}Co_{0.945}Mg_{0.05}Al_{0.005}O_2$ obtained above was used instead of $Li_{1.01}CoO_2$. With the use of the positive electrode, a secondary battery was produced in the same manner as in EXAMPLE 1.

Battery packs were produced in the same manner as in EXAMPLE 1 except that the above-obtained secondary battery and a thermal fuse with an operating temperature of 140° C. were used, and an evaluation was made in the same manner as in EXAMPLE 1. As a result, none of the 100 battery packs emitted smoke. The highest surface temperature of the battery was 155° C.

COMPARATIVE EXAMPLE 2

Battery packs were produced in the same manner as in EXAMPLE 1 except that the secondary battery containing the positive electrode active material, $Li_{1.01}Co_{0.945}Mg_{0.05}Al_{0.005}O_2$, produced in EXAMPLE 3 and a thermal fuse with an operating temperature of 150° C. were used, and an evaluation was made in the same manner as in EXAMPLE 1. As a result, 10 out of the 100 battery packs emitted smoke.

As is evident from the results of EXAMPLE 3 and COMPARATIVE EXAMPLE 2 where the positive electrode active material highly stable during overcharging was used, in spite of the fact that the non-recoverable device with an operating temperature 10° C. higher (140° C.) than the operating temperature (130° C.) of the non-recoverable device used in EXAMPLE 1 was used, none of the 100 batteries emitted smoke in EXAMPLE 3. When the non-recoverable device with an operating temperature of 150° C. was used, despite the use of the positive electrode active material highly stable during overcharging, the number of battery developing thermal runaway was the same as COMPARATIVE EXAMPLE 1, failing to reduce the number thereof in COMPARATIVE EXAMPLE 2.

EXAMPLE 4

A non-aqueous electrolyte was prepared by dissolving $LiBF_4$ in a solvent mixture containing 30 vol % of ethylene carbonate and 70 vol % of γ-butyrolactone at a $LiBF_4$ concentration of 1 mol/L.

A secondary battery with the positive electrode active material $Li_{1.01}Co_{0.945}Mg_{0.05}Al_{0.005}O_2$ was produced in the same manner as in EXAMPLE 3 except that the above-obtained non-aqueous electrolyte was used.

Battery packs were produced in the same manner as in EXAMPLE 1 except that the secondary battery produced above and a thermal fuse with an operating temperature of 140° C. were used, and an evaluation was made in the same manner as in EXAMPLE 1. As a result, none of the 100 battery packs emitted smoke. Besides, the highest surface temperature of the battery was 144° C.

COMPARATIVE EXAMPLE 3

Battery packs were produced in the same manner as in EXAMPLE 1 except that the secondary battery containing a non-aqueous solvent mixture of ethylene carbonate and γ-butyrolactone, the same as the one produced in EXAMPLE 4, and a thermal fuse with an operating temperature of 150° C. were used, and an evaluation was made in the same manner as in EXAMPLE 1. As a result, 10 out of the 100 battery packs emitted smoke.

As is evident from the results of EXAMPLE 4 and COMPARATIVE EXAMPLE 3 where the non-aqueous solvent highly stable during overcharging was used, in spite of the fact that the non-recoverable device with an operating temperature 10° C. higher (140° C.) than that (130° C.) of the non-recoverable device used in EXAMPLE 1 was used, the number of battery emitting smoke was 0 out of 100 in EXAMPLE 4. When the non-recoverable device with an operating temperature of 150° C. was used, despite the use of the non-aqueous solvent highly stable during overcharging, the number of battery developing thermal runaway was the same as COMPARATIVE EXAMPLE 1, failing to reduce the number thereof in COMPARATIVE EXAMPLE 3.

The highest surface temperature of the battery among the batteries of EXAMPLE 3 was 155° C., whereas that among the batteries of EXAMPLE 4 was only 144° C. Therefore, the battery packs of EXAMPLE 4 are considered to have better safety than those of EXAMPLE 3.

EXAMPLE 5

Positive electrode active materials were produced in the same manner as in EXAMPLE 3 except that titanium oxide, strontium hydroxide, manganese oxide, nickel hydroxide and calcium hydroxide were respectively used instead of aluminum hydroxide. The obtained positive electrode active materials were as follows:

$Li_{1.01}Co_{0.945}Mg_{0.05}Ti_{0.005}O_2$;

$Li_{1.01}Co_{0.945}Mg_{0.05}Sr_{0.005}O_2$;

$Li_{1.01}Co_{0.945}Mg_{0.05}Mn_{0.005}O_2$;

$Li_{1.01}Co_{0.945}Mg_{0.05}Ni_{0.005}O_2$; and $Li_{1.01}Co_{0.945}Mg_{0.05}Ca_{0.005}O_2$.

Positive electrodes were produced in the same manner as in EXAMPLE 1 except that the above active materials were respectively used instead of $Li_{1.01}CoO_2$. With the use of the positive electrodes, secondary batteries were produced in the same manner as in EXAMPLE 1.

Battery packs for each of the above-obtained secondary batteries were produced in the same manner as in EXAMPLE 1 except that the above-obtained secondary batteries and a thermal fuse with an operating temperature of 140° C. were used, and an evaluation was made in the same manner as in EXAMPLE 1. As a result, none of the 100 battery packs for each of the secondary batteries emitted smoke.

EXAMPLE 6

A non-aqueous electrolyte was prepared by dissolving $LiPF_6$ in a solvent mixture containing 30 vol % of ethylene carbonate and 70 vol % of γ-butyrolactone at a $LiPF_6$ concentration of 1 mol/L.

A secondary battery with the positive electrode active material $Li_{1.01}Co_{0.945}Mg_{0.05}Al_{0.005}O_2$ was produced in the same manner as in EXAMPLE 3 except that the above-obtained non-aqueous electrolyte was used.

Battery packs were produced in the same manner as in EXAMPLE 1 except that the secondary battery produced above and a thermal fuse with an operating temperature of 140° C. were used, and an evaluation was made in the same manner as in EXAMPLE 1. As a result, none of the 100 battery packs emitted smoke.

The foregoing has demonstrated that, even if $LiPF_6$ is used as a lithium salt instead of $LiBF_4$, it is possible to obtain a battery pack with a level of safety as high as that of EXAMPLE 4.

As described above, the present invention provides a lithium-ion secondary battery pack with improved safety and low production cost.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A battery pack comprising a lithium ion secondary battery and a current interrupting device for protecting said secondary battery,
    said secondary battery comprising a positive electrode and a negative electrode, a separator interposed between said positive and negative electrodes and a non-aqueous electrolyte,
    said current interrupting device comprising a recoverable device and a non-recoverable device,
    said recoverable device and said non-recoverable device being connected in series with each other, and
    said non-recoverable device having an operating temperature of not less than 130° C. and less than 150° C.,
    wherein said positive electrode comprises a composite oxide containing lithium, cobalt and magnesium.

2. The battery pack in accordance with claim 1, wherein said recoverable device comprises a bimetallic device, a shape memory alloy device or a PTC device, and said non-recoverable device comprises a thermal fuse or a pattern fuse.

3. The battery pack in accordance with claim 1, wherein said composite oxide is represented by the general formula: $Li_zCo_{1-x-y}Mg_xM_yO_2$, where the element M is at least one selected from the group consisting of Al, Ti, Sr, Mn, Ni and Ca, and the values x, y and Z respectively satisfy:

$0.005 \leq x \leq 0.1$;

$0.001 \leq y \leq 0.03$; and $0.97 \leq z \leq 1.02$.

4. The battery pack in accordance with claim 1, wherein said non-aqueous electrolyte comprises a non-aqueous solvent and a solute dissolved in said non-aqueous solvent, and said non-aqueous solvent comprises ethylene carbonate and γ-butyrolactone.

* * * * *